United States Patent [19]
Kuznicki et al.

[11] Patent Number: 5,371,899
[45] Date of Patent: Dec. 6, 1994

[54] COMMUNICATION SYSTEM CAPABLE OF REASSIGNING RADIO RECEIVERS

[75] Inventors: William J. Kuznicki, Coral Springs; Robert J. Schwendeman, Pompano Beach, both of Fla.

[73] Assignee: Motorola, Schaumburg, Ill.

[21] Appl. No.: 890,981

[22] Filed: May 29, 1992

[51] Int. Cl.$^5$ .............................................. H04Q 7/00
[52] U.S. Cl. ................................ 455/34.1; 455/38.1; 455/54.2; 370/95.1; 340/825.44
[58] Field of Search ................... 455/34.1, 38.1, 34.2, 455/56.1, 70, 67.1, 54.2, 115, 226.1, 228, 38.2–38.4; 370/95.1, 95.3; 340/825.44, 825.47, 825.54, 825.03, 825.04

[56] References Cited

U.S. PATENT DOCUMENTS

| | | | |
|---|---|---|---|
| Re. 28,577 | 10/1975 | Schmidt | 455/34.2 |
| 4,870,408 | 9/1989 | Zdunek et al. | 455/34.1 |
| 4,910,510 | 3/1990 | Davis et al. | 340/825.44 |
| 5,043,718 | 8/1991 | Shimura | 340/825.47 |
| 5,124,985 | 6/1992 | Hoshikawa | 455/34.1 |
| 5,153,582 | 10/1992 | Davis | 340/825.44 |

*Primary Examiner*—Curtis Kuntz
*Assistant Examiner*—Philip J. Soburka
*Attorney, Agent, or Firm*—Keith A. Chanroo; Thomas G. Berry

[57] ABSTRACT

A radio communication system (100) has radio receivers (106) assigned to a predetermined one of a plurality of time periods (FRAME 0-127). The radio communication system (100) comprises a transmitter (104) that transmits information during the predetermined time period (FRAME 0-127) assigned to at least one radio receiver (106). A receiver (202, 206) receives information directed to said at least one radio receivers (106), the radio receivers (106) being individually assigned to receive information during at least one of a plurality of predetermined time periods (FRAME 0-127). A monitoring device (1702) monitors a level of traffic associated with each of the predetermined time periods (FRAME 0-127) and a measuring device (1704) measures a level of traffic associated with the at least one radio receiver (106) over the assigned predetermined time period (FRAME 0-127). An identifying device (1708) which is coupled to the measuring device (1704) identifies if the level of traffic associated with the at least one radio receiver (106) exceeds a predetermined threshold value during the assigned predetermined time period (FRAME 0-127). A generator (1732) which is coupled to the measuring device (1706) and to the identifying device (1708) generates a control signal, and the transmitter (1736) transmits the control signal to the at least one radio receiver (106) for reassigning the at least one radio receiver (106). The at least one radio receiver (106) comprises a receiver (804) which receives the control signal and a decoder (810) which is coupled to the receiver (804) which decodes the control signal. A reassigning device (1812) which is coupled to the decoder (810) reassigns the radio receiver (106) from the assigned predetermined time period (FRAME 0-127) to another of the plurality of predetermined time periods (FRAME 0-127) having a lower level of traffic value associated therewith for reducing the level of traffic in the assigned predetermined time period (FRAME 0-127).

15 Claims, 11 Drawing Sheets

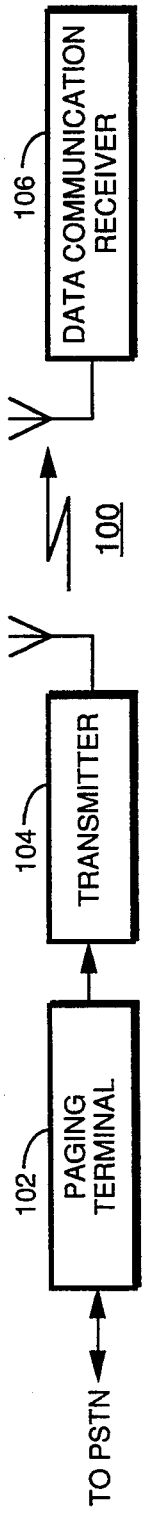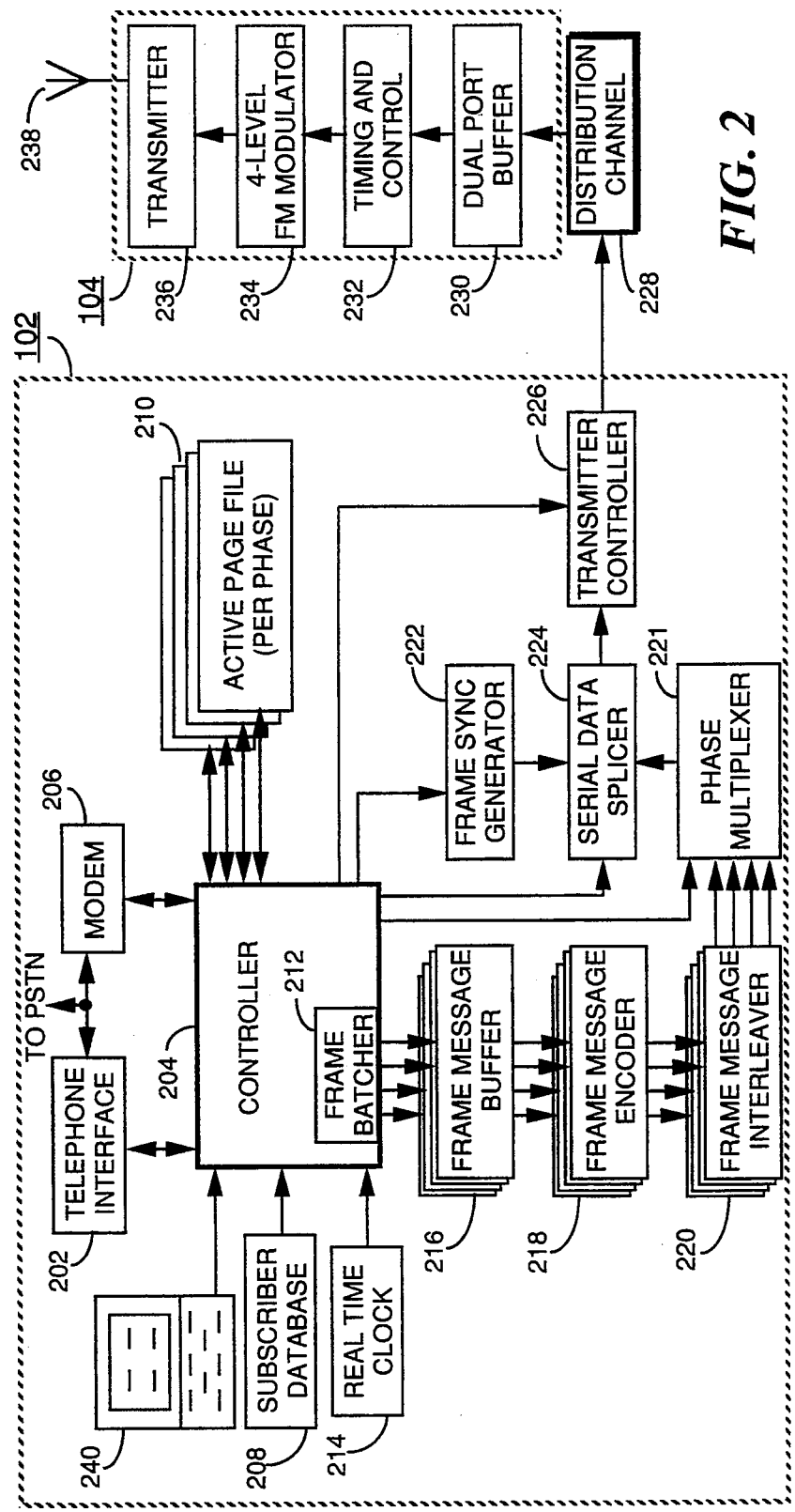

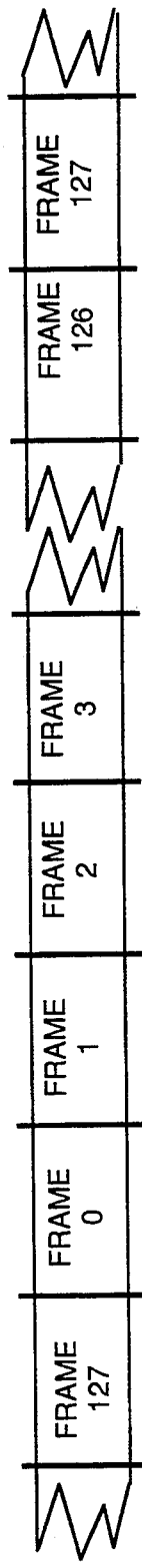
FIG. 3
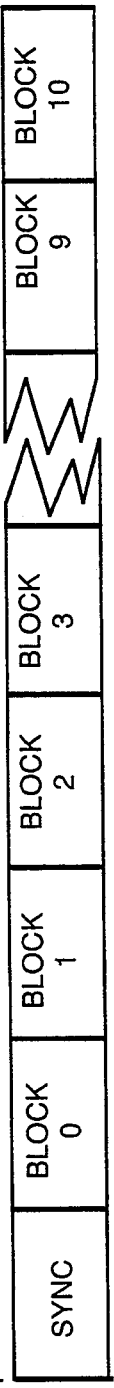
FIG. 4
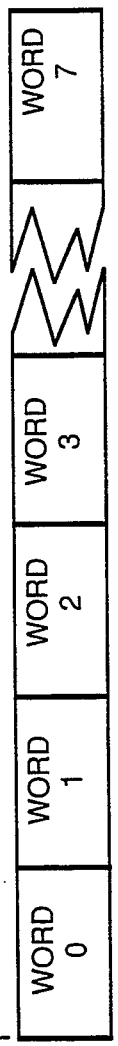
FIG. 5
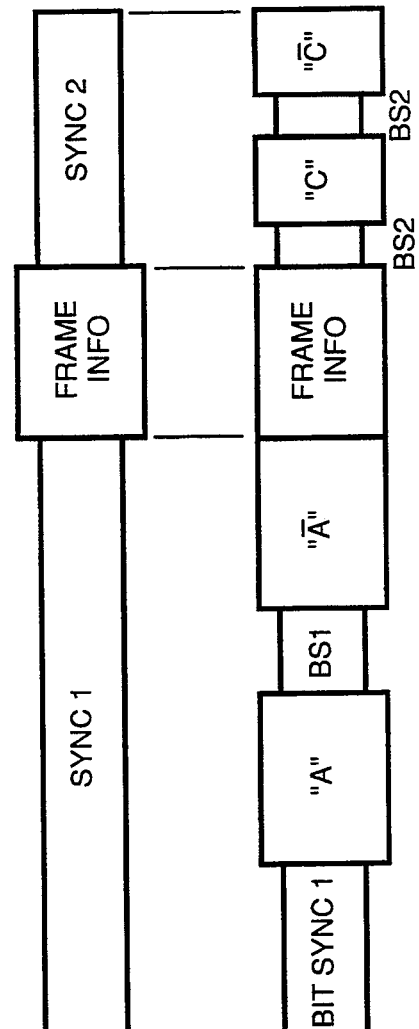
FIG. 6
FIG. 7

COMMUNICATION SYSTEM CAPABLE OF REASSIGNING RADIO RECEIVERS

FIELD OF THE INVENTION

This invention relates in general to communication systems; and more specifically to a communication system capable of reassigning radio receivers.

BACKGROUND OF THE INVENTION

Current communication systems have endeavored to efficiently communicate information to receivers, for example, selective call receivers (pagers), while providing for effective battery saving operations of the selective call receivers. With synchronous signalling and coding formats, receivers are divided into a plurality of frames (e.g., queues), each frame occurring at a predetermined period and having a predetermined maximum message information capacity, etc. Since the synchronous signals are always being transmitted, no preamble signals are required, and the selective call receivers need only to decode paging information while its preassigned frame is being transmitted.

However, varying traffic demands (the amount of message information for a group of selective call receivers) may cause the amount of message information for one group or queue of selective call receivers to exceed the maximum capacity of the frame (or queue) while another frame has available capacity. Thus, throughput is decreased by transmitting idle signals during one frame while another frame has message information exceeding its capacity.

Also, one or more radio receivers (subscribers) in the communication system may receive excessively long messages or receive messages too frequently which substantially increase the delay within the system frame for the other radio receivers that are receiving average length and frequency of messages. The resulting increase in length of the system queue is undesirable because too long a delay for radio receivers to receive messages within that frame, and any further traffic increase on that frame will quickly increase the length of the system queue beyond the system capacity.

Thus, what is needed is a communication system capable of identifying the radio receivers that are receiving above-average traffic and reassigning the radio receivers to eliminate imbalances between system frames of the communication system.

SUMMARY OF THE INVENTION

A radio communication system having radio receivers that are assigned to a predetermined one of a plurality of time periods. The radio communication system comprises a transmitter that transmits information during the predetermined time period assigned to at least one radio receiver. A receiver receives information directed to at least one of the radio receivers, the radio receivers being individually assigned to receive the information during at least one of a plurality of predetermined time periods. A monitoring means monitors a level of traffic associated with each of the predetermined time periods and a measuring means measures a level of traffic associated with at least one of the radio receivers over the assigned predetermined time period. An identifying means which is coupled to the measuring means identifies if a level of traffic associated with at least one radio receiver exceeds a predetermined threshold value during the assigned predetermined time period. A generating means which is coupled to the measuring means and to the identifying means generates a control signal, and the transmitter transmits the control signal to the at least one radio receiver for reassigning the at least one radio receiver. The at least one radio receiver comprises a receiver which receives the control signal and a decoder which is coupled to the receiver which decodes the control signal. A reassigning means which is coupled to the decoder reassigns the radio receiver from the assigned predetermined time period to another of the plurality of predetermined time periods having a lower level of traffic value associated therewith for reducing the level of traffic in the assigned predetermined time period.

In a radio communication system having subscribers assigned to one of a plurality of predetermined time periods on at least one radio frequency, a method for reassigning the radio receivers, comprising the steps of:

(a) monitoring the level of received information traffic associated with each of the plurality of predetermined time periods for transmitting to at least one of the plurality of radio receivers;

(b) measuring the level of traffic associated with one or more radio receivers over the predetermined time period;

(c) determining if one or more of the radio receivers during the predetermined time period has a traffic level above a threshold value; and (d) reassigning one or more selected radio receivers to reduce the traffic level of the predetermined time period when one or more of the radio receivers have a traffic level above the threshold value.

BRIEF DESCRIPTION OF THE DRAWINGS

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIGS. 3-5 are timing diagrams illustrating the transmission format of the signaling protocol utilized in accordance with the preferred embodiment of the present invention.

FIGS. 6 and 7 are timing diagrams illustrating the synchronization signals utilized in accordance with the preferred embodiment of the present invention.

DESCRIPTION OF A PREFERRED EMBODIMENT

Figure 8:
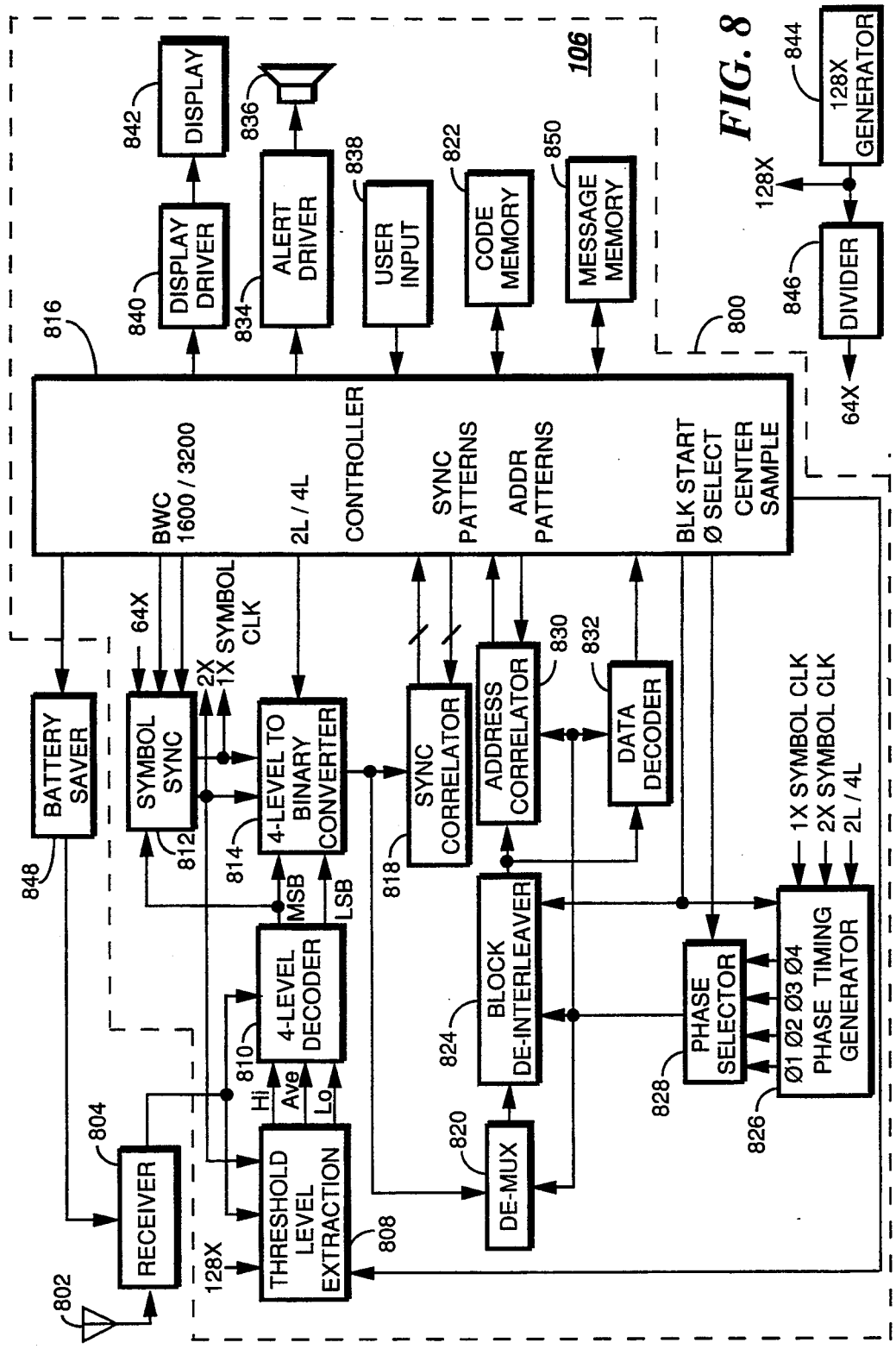
FIG. 8 is an electrical block diagram of a data communication receiver in accordance with the preferred embodiment of the present invention.

FIG. 1 is an electrical block diagram of a data transmission system 100, such as a paging system, in accordance with the preferred embodiment of the present invention In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104, preferably in simulcast, transmit the message information to data communication receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone, are coupled to the paging terminal 102 through a telephone interface 202 in a manner well known in the art. Longer messages, such as alphanumeric messages which require the use of a data entry device, are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to, such information as addresses assigned to the data communication receiver, message type associated with the address, and information related to the status of the data communication receiver, such as active or inactive for failure to pay the service charges. A data entry terminal 240 is provided which couples to the controller 204, and which is used for such purposes as entry, updating and deleting of information stored in the subscriber data base 208, for monitoring system performance, and for obtaining such information as service charge information.

The subscriber database 208 also includes such information as to what transmission frame and to what transmission phase the data communication receiver is assigned, as will be described in further detail below. The received message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically ,the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system.

The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers such as pagers, assigned to one or more of 128 frames which are labeled frame 0 through frame 127. It then will be appreciated that the actual number of flames provided within the signaling protocol can be greater or less than described above. The greater the number of frames utilized, the greater the battery life that may be provided to the data communication receivers operating within the system. The fewer the number of frames utilized, the more often messages can be queued and delivered to the data. Communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5, each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words that utilize the first code word bit to define the code word type, as either address or data, no such distinction is provided for the address and data code words in the signaling protocol utilized with the preferred embodiment of the present invention. Rather, address and data code words are defined by their position within the individual frames.

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
| --- | --- |
| 1600 bps | A1 and A1 bar |
| 3200 bps | A2 and A2 bar |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization the frame transmission data bit rate.

In summary, the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

FIG. 8 is an electrical block diagram of the data communication receiver 106 in accordance with the preferred embodiment of the present invention. The heart of the data communication receiver 106 is a controller 816, which is preferably implemented using an MC68HC05HC11 microcomputer, such as manufactured by Motorola, Inc. The microcomputer controller, hereinafter call the controller 816, receives and processes inputs from a number of peripheral circuits, as shown in FIG. 8, and controls the operation and interaction of the peripheral circuits are achieved by using software subroutines. The use of a microcomputer controller for processing and control functions is well known to one of ordinary skill in the art.

Figure 9:
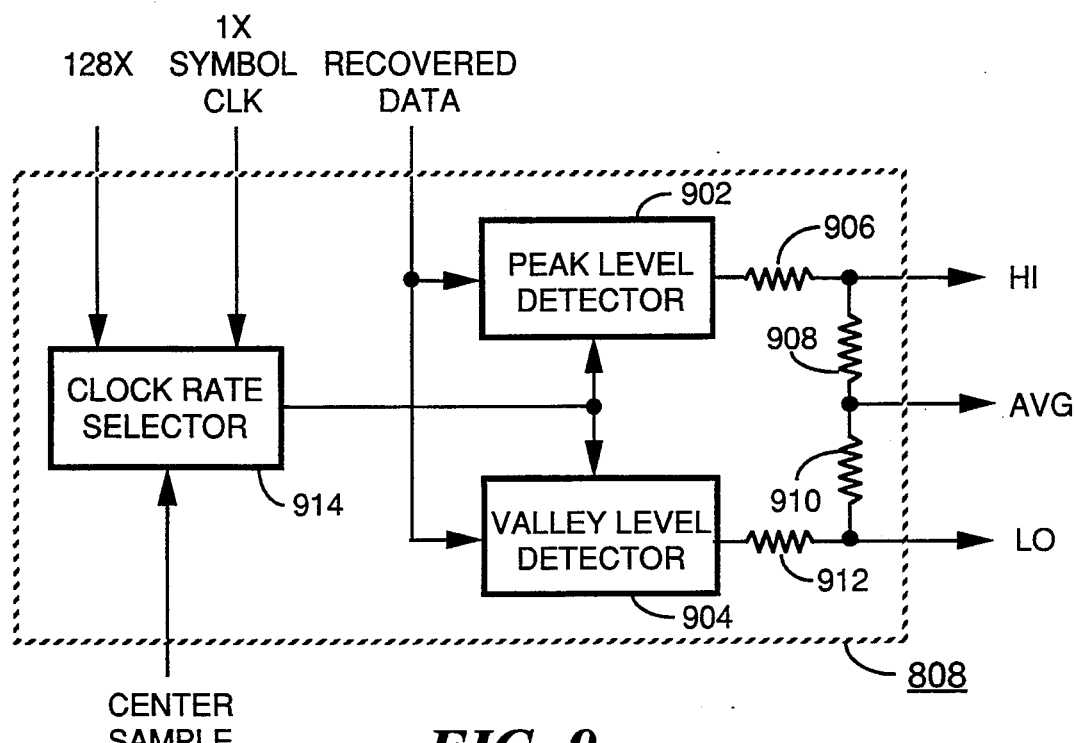
FIG. 9 is an electrical block diagram of a threshold level extraction circuit utilized in the data communication receiver of FIG. 8.

The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810. The threshold level extraction circuit 808 is best understood by referring to FIG. 9, and as shown, comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The level detector 902, 904 signal outputs are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128× clock, i.e. a clock having a frequency equivalent to 128 times the slowest data bit rate, which as described above is 1600 bps. The 128× clock is generated by 128× clock generator 844, as shown in FIG. 8, which is preferably a crystal controlled oscillator operating at 204.8 kHz (kiloHertz). The output of the 128× clock generator 844 couples to an input of frequency divider 846 which divides the output frequency by two to generate a 64× clock at 102.4 kHz. Returning to FIG. 9, the 128× clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1× symbol clock which is generated by symbol synchronizer 812 as shown in FIG. 8.

Figure 10:
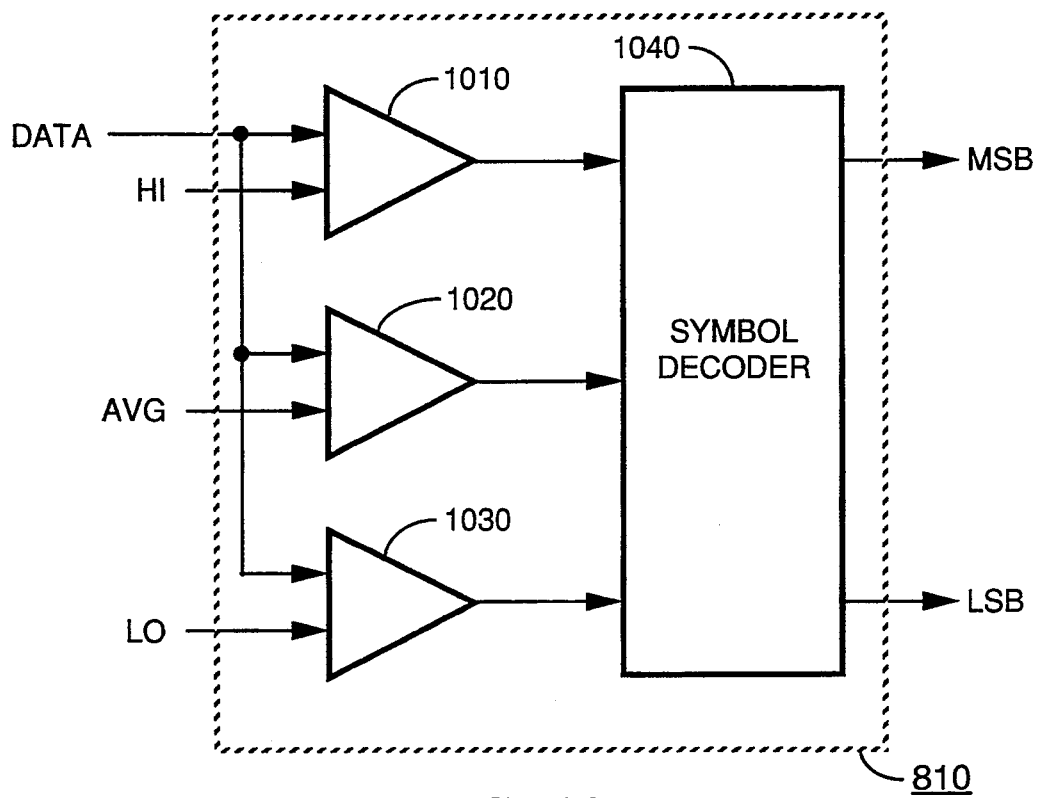
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
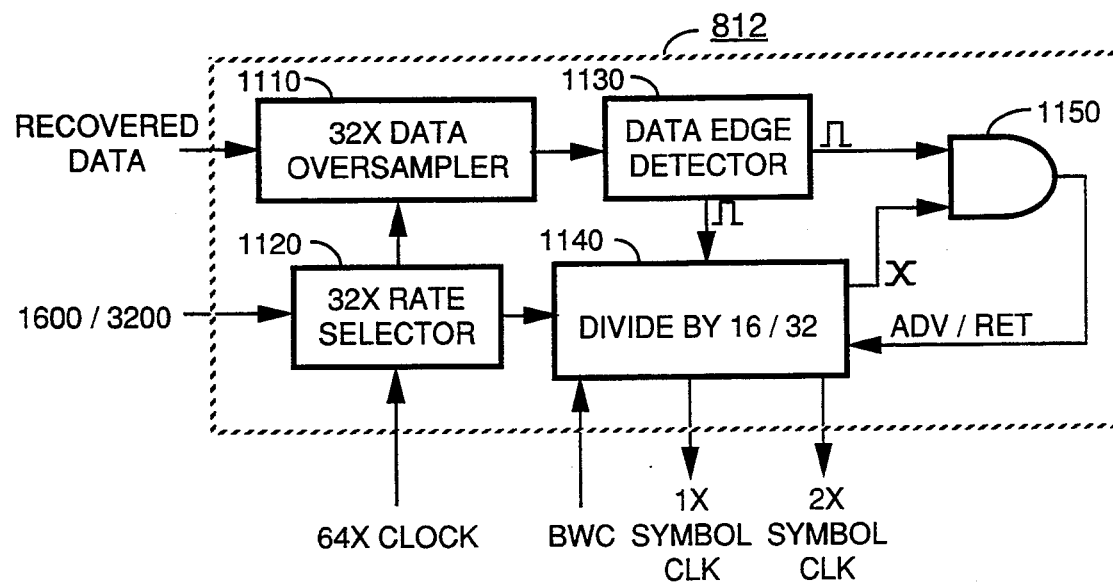
FIG. 11 is an electrical block diagram of a symbol synchronizer utilized in the data communication receiver of FIG. 8.

The operation of the symbol synchronizer 812 is best understood by referring to FIG. 11. The 64× clock at 102.4 kHz which is generated by frequency divider 846, is coupled to an input of a 32× rate selector 1120. The 32× rate selector 1120 is preferably a divider which provides selective division by 1 or 2 to generate a sample clock which is thirty-two times the symbol transmission rate. A control signal (1600/3200) is coupled to a second input of the 32× rate selector 1120, and is used to select the sample clock rate for symbol transmission rates of 1600 and 3200 symbols per second. The selected sample clock is coupled to an input of 32× data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate 1× and 2× symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1× and 2× symbol clocks with the recovered data signal. The symbol clock rates generated are best understood from the table below.

| Input Clock (Relative) | Control Input (SPS) | Rate Selector Divide Ratio | Rate Selector Output | 2× Symbol Clock (BPS) | 1× Symbol Clock (BPS) |
|---|---|---|---|---|---|
| 64× | 1600 | by 2 | 32× | 3200 | 1600 |
| 64× | 3200 | by 1 | 64× | 6400 | 3200 |

As shown in the table above, the 1× and 2× symbol clocks are generated at 1600, 3200 and 6400 bits per second and are synchronized with the recovered data signal.

Figure 12:
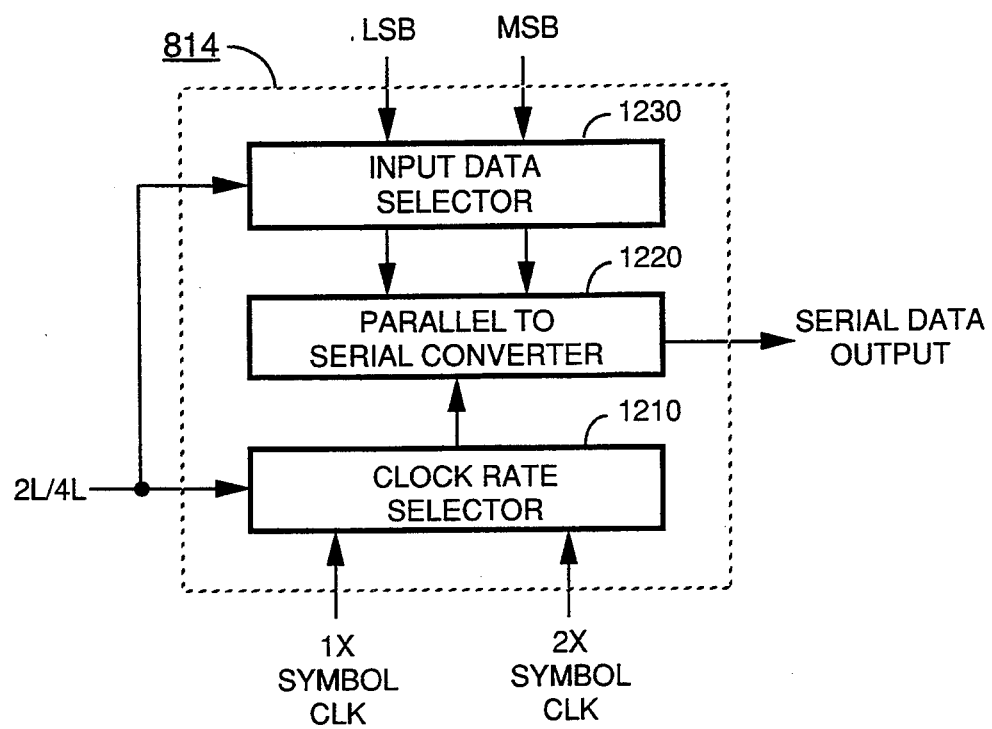
FIG. 12 is an electrical block diagram of a 4-level to binary converter utilized in the data communication receiver of FIG. 8.

The 4-level binary converter 814 is best understood by referring to FIG. 12. The 1× symbol clock is coupled to a first clock input of a clock rate selector 1210. A 2× symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1× clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2× clock input is selected by clock rate selector 1210 which results in a serial two bit binary data stream to be generated at 2× the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator is best understood with reference to FIG. 13. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 13:
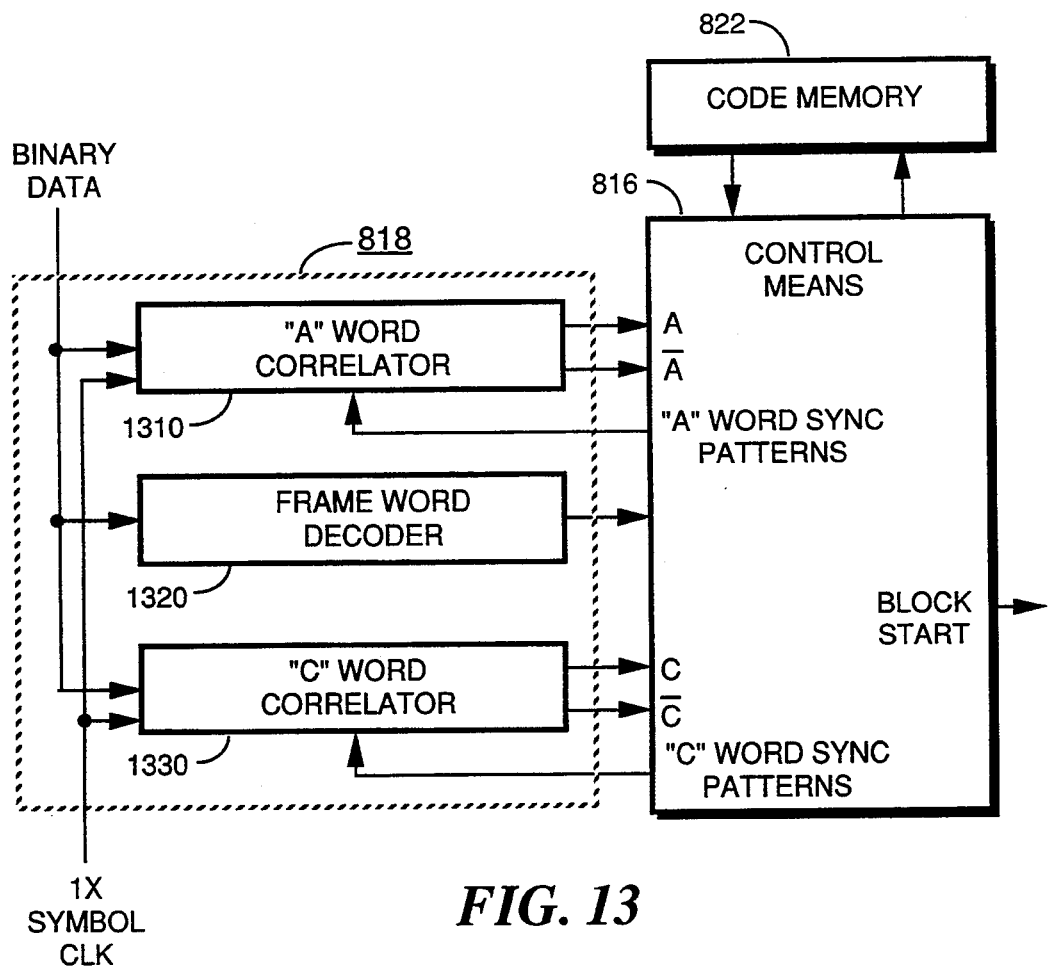
FIG. 13 is an electrical block diagram of a synchronization correlator utilized in the data communication receiver of FIG. 8.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
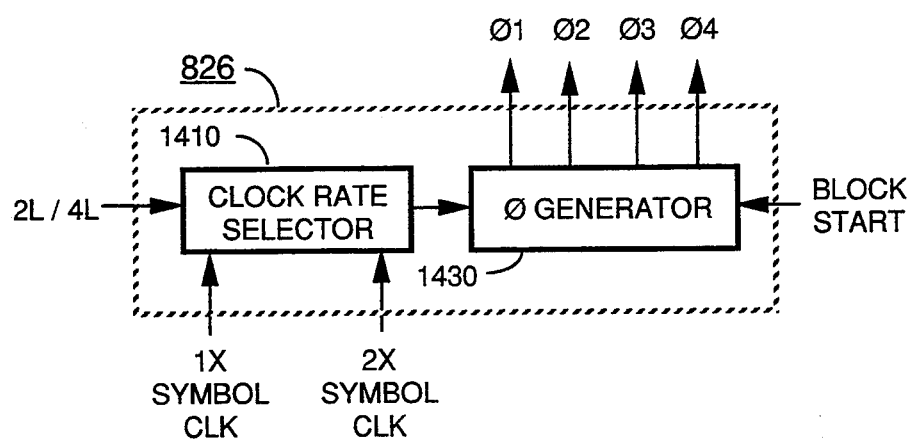
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 14. A control signal (2L/4L) is coupled to an input of clock rate selector 1410 which selects either 1X or 2X symbol clock inputs. The selected symbol clock is coupled to the input of a phase generator 1430 which is preferably a clocked ring counter which is clocked to generate four phase output signals ($\phi 1$–$\phi 4$). A block start signal (BLK START) is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 recovers from the code memory 822, the transmission phase number to which the data communication receiver is assigned. The phase number is transferred to the phase select output ($\phi$ Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 830. The controller 816 recovers the address patterns assigned to the data communication receiver, and couples the patterns to a second input of the address correlator. When any of the de-interleaved address code words matches any of the address patterns assigned to the data communication receiver within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

Figure 15:
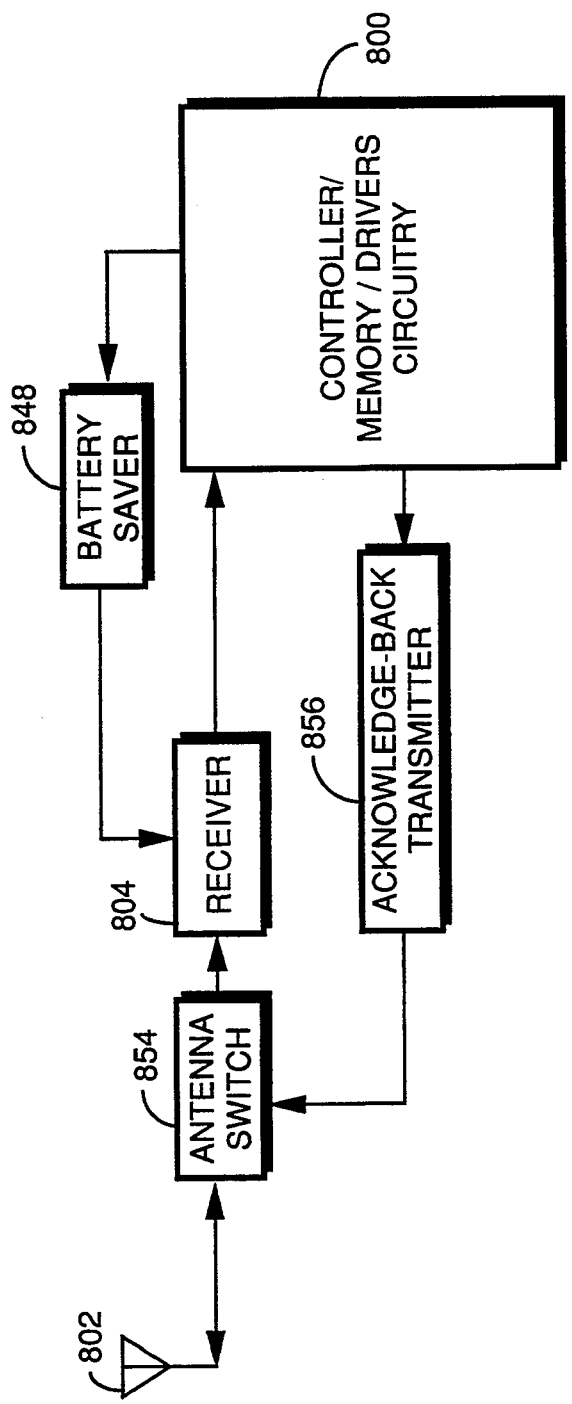
FIG. 15 is an electrical block diagram of a data communication receiver with an acknowledge-back transmitter in accordance with a second embodiment of the present invention.

FIG. 15 is an electrical block diagram of a second embodiment of the data communication receiver 106 shown in FIG. 8. The structure and operation remains substantially the same as shown in FIG. 8, but for the differences which will be illustrated below. Specifically, according to the second embodiment shown in FIG. 15, the antenna 802 is coupled to an antenna switch 854 which enables the antenna 802 to be switched between receiving and transmitting modes, a technique which is well known to those skilled in the art. An acknowledge-back transmitter 856 is coupled to the antenna switch 854 and the controller/memory/driver circuit embodied in block 800. Operationally, when the data communication receiver 106 is receiving data, the antenna switch 854 is switched by the controller 816 (shown in FIG. 8 and embodied in block 800) to the receiving mode, and the data received by the antenna 802 is passed to the receiver 804 as discussed in FIG. 8. When the data communication receiver 106 is transmitting data (e.g., an acknowledge-back response as will be described below), the controller 816 switches the antenna switch 854 to the transmitting mode, and the data is passed from the controller 816 via the acknowledge-back transmitter 856 and is transmitted by the antenna 802.

Figure 16:
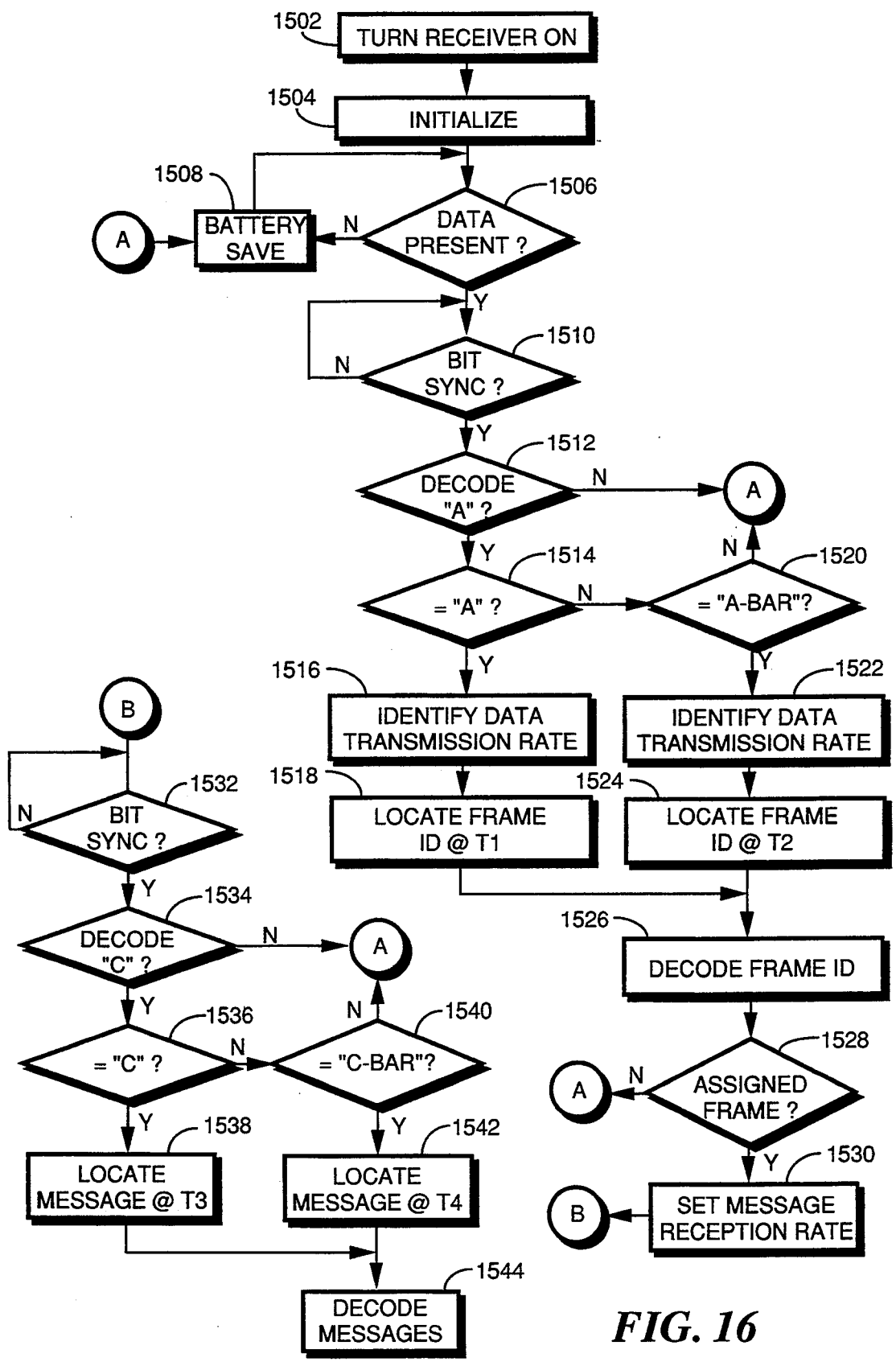
FIG. 16 is a flow chart illustrating the synchronization correlation sequence in accordance of the present invention.

FIG. 16 is a flow chart describing the operation of the data communication receiver in accordance with the preferred embodiment of the present invention. At step 1502, when the data communication receiver is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel at step 1506, the synchronization word correlator begins searching for bit synchronization at step 1510. When bit synchronization is obtained, at step 1510, the "A" word correlation begins at step 1512. When the noncomplemented "A" word is detected, at step 1514, the message transmission rate is identified as described above, at step 1516, and because frame synchronization is obtained, the time (T1) to the start of the frame identification code word is identified, at step 1518. When the noncomplemented "A" word is not detected, at step 1514, indicating the noncomplemented "A" word may have been corrupted by a burst error during transmission, a determination is made whether the complemented "A" bar" is detected, at step 1520. When the "A bar" word is not detected at step 1520, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1533, the "C" word correlation begins at step 1534. When the non-complemented "C" word is detected., at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C-bar" is detected, at step 1540. When the "C-bar" word is not detected at step 1540, indicating that the "C-bar" word may also have been corrupted by a burst error during transmission, battery saver operation is again resumed, at step 1508. When the "C-bar" word is detected, at step 1540, frame synchronization is obtained, and the time (T4) to the start of the message information is identified, at step 1542. At the appropriate time, message decoding can begin at step 1544.

In code words which are spaced in time, the reliability of synchronizing with synchronization information that is subject to burst error corruption is greatly enhanced. The use of a predetermined synchronization code word as the first synchronization code word, and a second predetermined synchronization code word which is the complement of the first predetermined synchronization code word, allow accurate frame synchronization on either the first or the second predetermined synchronization code word. By encoding the synchronization code words, additional information, such as the transmission data rate, can be provided, thereby enabling the transmission of message information at several data bit rates. By using a second coded synchronization word pair, "fine" frame synchronization at the actual message transmission rate can be achieved, and as above, due to spacing in time of the synchronization code words, the reliability of synchronizing at a different data bit rate with synchronization information which is subject to burst error corruption is greatly enhanced, thereby improving the reliability of the data communication receiver to receive and present messages to the receiver user.

Figure 17:
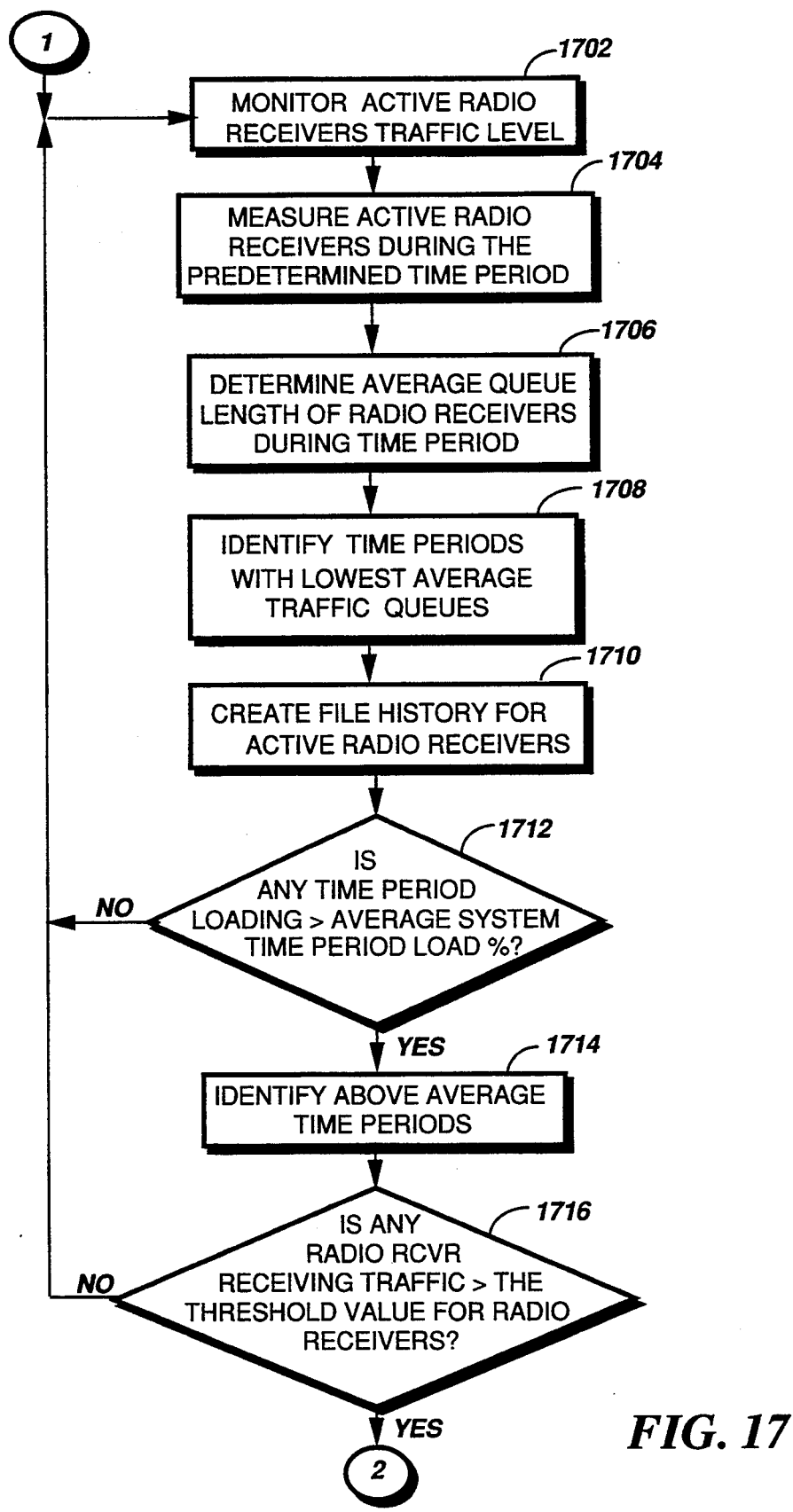
FIGS. 17 and 18 are flow diagrams illustrating the reassignment sequence of the communication system in accordance with the preferred embodiment of the invention.
Figure 18:
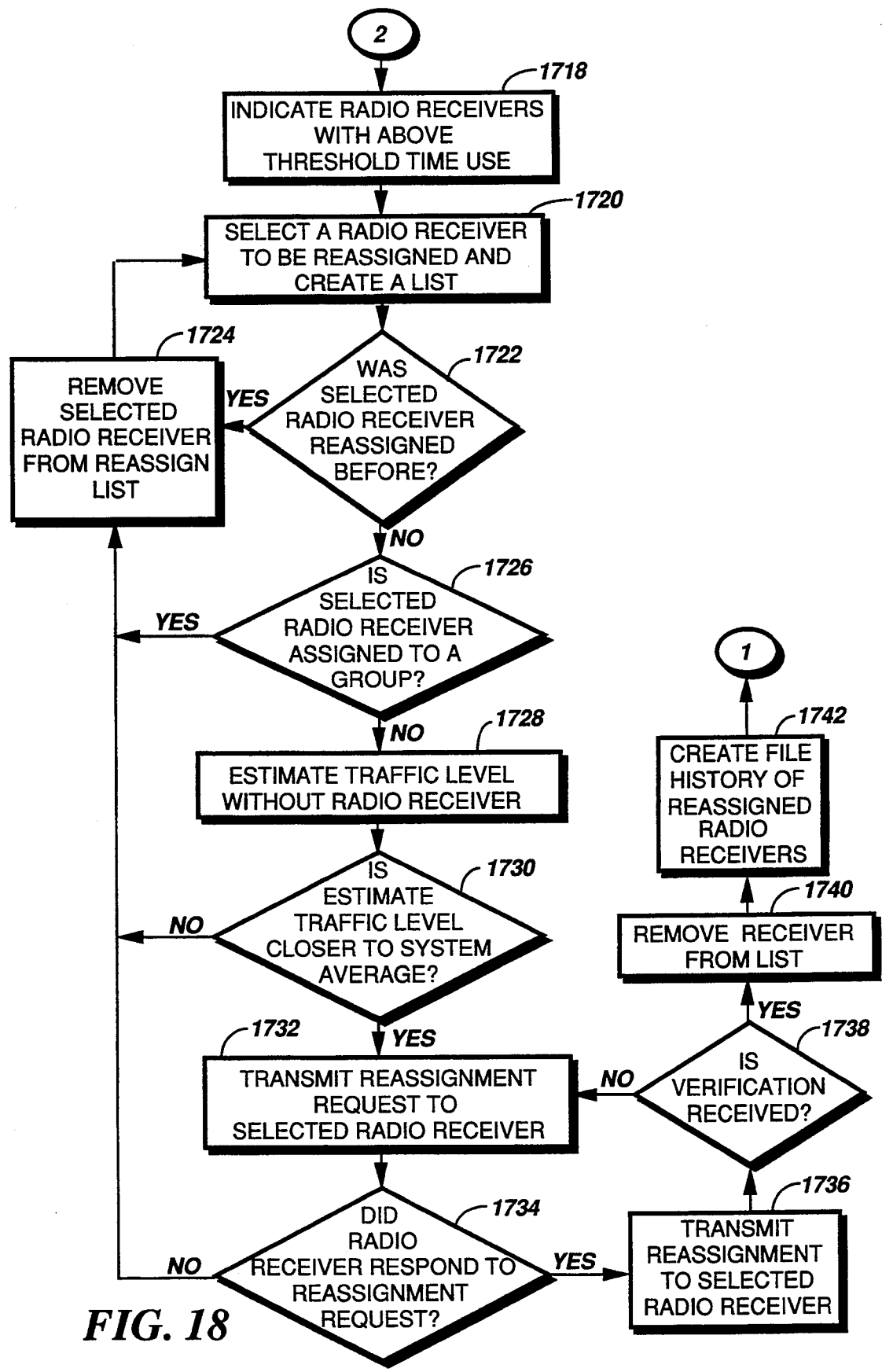

FIGS. 17 and 18 are flow diagrams illustrating the reassignment sequence by the communication system in accordance with the preferred embodiment of the invention. Specifically referring to FIG. 17, after the synchronization sequence, the communication system, for example, the paging terminal or base station, monitors traffic intended for the radio receivers that are active during each of the predetermined time periods to determine the traffic intended during each of the predetermined time periods, step 1702. That is, step 1702 monitors the traffic in the queues of the communication system of each predetermined time periods. Frames and phases are described above in FIG. 3, and time periods or predetermined time periods are used hereafter to refer to flames and/or phases because one of ordinary skill in the art will appreciate that frames or phases are predetermined time periods. Also, the level of traffic in a predetermined time period is determined by a measure of the time of the intended information and the length of the predetermined time period. Thus, the level of traffic for each predetermined time period is the calculated average of the time of the intended information time divided by the predetermined time period. Alternately, the traffic level can be determined by counting data elements (e.g., data bits, characters, or a measure of the time information is present during the predetermined time period). Step 1704 determines the radio receivers that are most active during the predetermined time periods. The activity of the radio receivers are determined by a product of the number of calls received by that radio receiver (i.e., call rate) and the number of call elements (e.g., number of characters of total information, the number of bits of information, etc.). The average queue length of each time period is then determined for each time period which generally includes a determination for each frame or for each phase, step 1706. The time periods with the lowest average queue length (minimum traffic during the predetermined time period) are then identified, step 1708. In step 1710, a file history of the most active radio receivers during each of the predetermined time periods is created to facilitate reassignment of radio receivers when needed. Subsequent to the creation of the file history, the system determines when any predetermined time period has a traffic level greater than the average system traffic level percentage for that time period, step 1712. If no, the system returns to step 1702. When yes, the traffic level for that predetermined time period which is greater than the system traffic level is identified, step 1714. Next, the system determines if any radio receivers' traffic levels are greater than the threshold value for the radio receivers, step 1716. This threshold value is preferably a chosen percentage above the average queue length for all radio receivers within the predetermined time periods. Alternatively, the threshold value can be a chosen percentage above the average queue length for all radio receivers within the communication system. When a particular radio receiver's traffic level is not greater than the threshold value calculated for the radio receiver, the system flow returns to step 1702 to continue to monitor radio receivers' activity.

In FIG. 18, the flow diagram continues at step 1718 where the radio receivers identified with traffic levels above the system plan (e.g., traffic level above a threshold value of time use for the predetermined time period) are indicated. Then in step 1720, the system selects a radio receiver as a candidate to be reassigned and creates a list of radio receivers that are selected. The radio receivers can be selected from, for example, the radio receivers that subscribe to a high data service such as graphics or alphanumeric, etc. Alternatively, the radio receivers can be selected from the radio receivers identified with a traffic level above the traffic level threshold value or because the radio receivers were identified with a traffic level below the traffic level threshold value. Any of the above criteria for selecting a radio receiver as a candidate to be assigned may approximate the same result but with a different amount of computation involved in achieving a balanced traffic level among the plurality of predetermined time periods. A balanced traffic level is achieved when all 128 frames or time periods have approximately the same amount of traffic or queue length or when none of the predetermined time periods have a traffic level that exceeds the average system plan traffic level.

According to the preferred embodiment of the present invention, a radio receiver with an indicated above average traffic level is selected to be reassigned. After selecting the radio receiver, step 1722 determines whether that radio receiver has been reassigned before within a predetermined length of time. If so, that selected radio receiver is removed from the list of radio receivers to be reassigned, step 1724, and the flow returns to step 1720 where the system selects another radio receiver with above threshold traffic level or time use. Alternately, when the selected radio receiver was not reassigned before, the system determines if the selected radio receiver is assigned to a group with other radio receivers, step 1726. When that radio receiver is a member of a group of radio receivers, then the other members of that group would also have to be reassigned. Therefore, when the radio receiver is a member of a group of radio receivers, then that selected radio receiver is removed from the reassignment list to simplify the reassignment sequence, step 1724, and then the flow returns to step 1720 where the system selects another radio receiver with above threshold traffic level or time use. Reassigning radio receivers that are members of a group of radio receivers would frustrate the reassignment of radio receivers in achieving a balance in the traffic on the plurality of time periods because the increase in the number of calculations (e.g., one for each radio receiver of the group) would over-burden the system to reassign all the members of the group.

Alternately, when the selected radio receiver is not a member of a group, the traffic level is estimated or calculated without any traffic contribution of the selected radio receiver to that predetermined time period at the time of calculation, step 1728. At step 1730, the estimated traffic level without the traffic contribution of the selected radio receiver is determined to ensure that the removal of the selected radio receiver from that predetermined time period will reduce the traffic level of that time period to approach the average of the system traffic level. In this way, the effect of the removal of the radio receiver from that predetermined time period is determined before the actual reassignment to ensure that the reassignment reduces the traffic level of that predetermined time period. The radio receiver's traffic is also estimated in other predetermined time periods, preferably predetermined time periods with below traffic level below average traffic levels. An estimate of the placement of the radio receiver within another time period is also determined so that the reassignment of the selected radio receiver does not cause another predetermined time period to which it will be reassigned to exceed the traffic level for the system plan. If not, the selected radio receiver is removed from the list, step 1724, and another radio receiver with average traffic above the system plan is selected, step 1720. If the selected radio receiver was determined to reduce the traffic level to approach the satisfaction of the system traffic level, a request for reassignment is transmitted to the radio receiver, step 1732. The system terminal then waits for a response, preferably by telephone, from the user of the radio receiver to indicate the receipt of the request for reassignment, step 1734. When no response is received within the period for response, the selected radio receiver is removed from the list, step 1724, and another radio receiver with average traffic above the system plan is selected, step 1720. Alternatively, when the user of the radio receiver responds, the system transmits a reassignment control signal to the selected radio receiver, step 1736. The system then waits for a verification of a successful reassignment of the radio receiver, preferably from the user of the radio receiver, step 1738. If the reassignment was unsuccessful, the reassignment code is retransmitted, step 1732. Upon a successful reassignment, the radio receiver is removed from the list of radio receivers to be reassigned, step 1740, and a file history is created for the radio receivers that were reassigned to another predetermined time period, step 1742. The sequence discussed in FIGS. 17 and 18 is repeated until each time period is within a specified increment in traffic level variation which is determined to approximate a balanced traffic level during each of the plurality of time periods.

Reassigning a radio receiver with an acknowledge-back transmitter would eliminate the need for the user of the radio receiver to call the system administrator to coordinate the reassignment procedure. With the acknowledge-back transmitter, the radio receiver transmits a response after receiving the request for reassignment. This acknowledge-back response confirms that the radio receiver received that request for reassignment. Upon receipt of the acknowledge-back response by the system, the reassignment control signal is then sent to the radio receiver to reassign the radio receiver. When the radio receiver receives the control signal, the radio receiver is reassigned or reprogrammed to receive information during another predetermined time period. The system then sends a signal to the radio receiver during the reassigned predetermined time period, and when the signal is successfully received by the radio receiver, the acknowledge-back transmitter responds by transmitting a signal to the terminal to indicate successful reassignment of the radio receiver.

Figure 19:
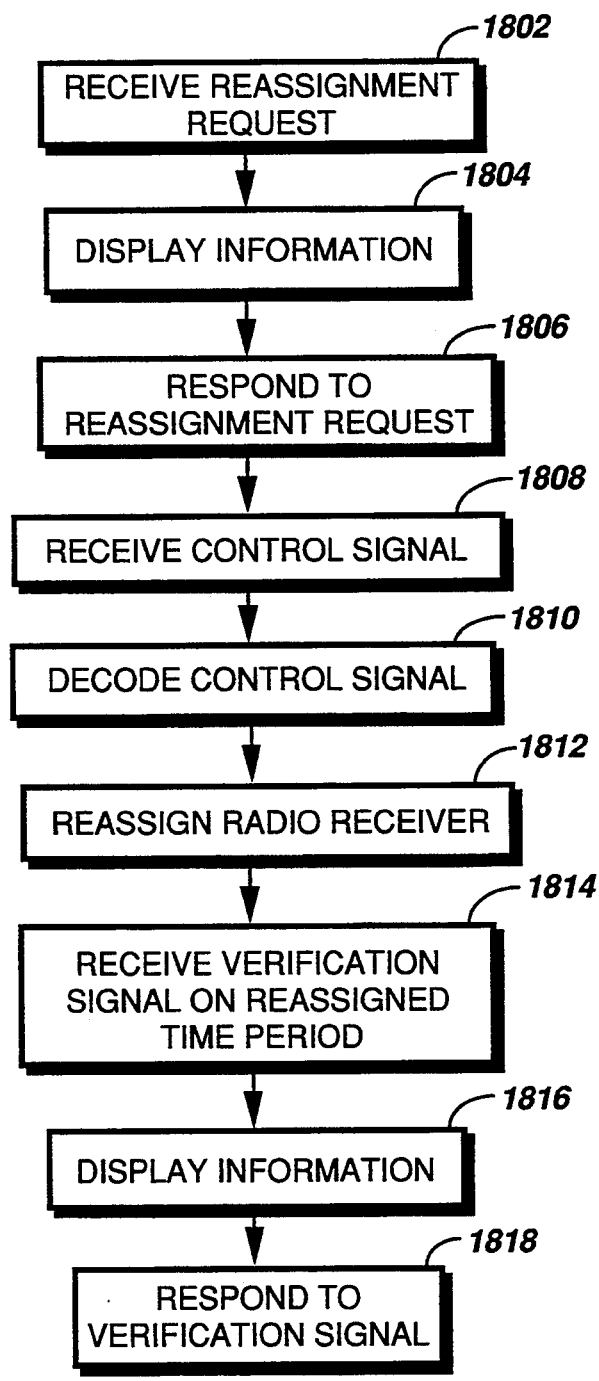
FIG. 19 is flow diagram illustrating the reassignment sequence of the radio receiver in accordance with the preferred embodiment of the invention.

Referring to FIG. 19, a flow diagram is shown illustrating the reassignment sequence of the radio receiver in accordance with the preferred embodiment of the invention. In step 1802, the radio receiver receives the request for reassignment, and displays information contained therein to a user of the radio receiver, step 1804. A response, preferably within a few minutes, to the request for reassignment is transmitted to the paging terminal, preferably to the administrator, step 1806. That is, the user of the radio receiver via telephone contacts the system administrator or service provider. The radio receiver then receives the control signal transmitted by the paging terminal, step 1808, and decodes the control signal to determine another one of the plurality of predetermined time periods for reassigning the radio receiver, step 1810. In step 1812, the radio receiver is reprogrammed by the received control signal and thus reassigned to the predetermined time period designated by the control signal. Subsequent to reassignment, the radio receiver receives a verification signal on the reassigned predetermined time period, step 1814, and displays the information contained therein which verifies a successful reassignment of the radio receiver, step 1816. After receipt of the verification signal, the user of the radio receiver acknowledges whether or not the verification signal was successfully received, step 1818.

According to the preferred embodiment of the present invention, the following sequence of steps are performed: First, a request is transmitted to the radio receiver to be assigned which is received by the radio receiver. The paging terminal waits an appropriate length of time for a response from the radio receiver. When a response is received, a system administrator causes the transmission of the reassignment control signal to the selected radio receiver as in step 1736. The radio receiver will also display received characters or data which will be verified by the user and the system administrator via a telephone call by the user of the radio receiver as in step 1804. When the reassignment sequence (control signal) is correctly received, the radio receiver will reprogram the radio receiver to interrogate another time period for its address and other data information, step 1812. Upon verification, the same characters or data will again be sent to the radio receiver addressed during the reassigned (the new) predetermined time period. Upon verification of the receipt of the retransmitted data again, the radio receiver will then have been successfully reassigned to the new time period which is determined to approach a balance of the traffic level between the plurality of predetermined time periods in the system, step 1818.

The communication system, as described above, has the capability for reassigning radio receivers that are measured to have a traffic level above a threshold value for radio receivers during a predetermined time period which also has a traffic level above the system plan traffic level while other predetermined time periods have traffic level below the system plan. A balanced communication system is desired because a balanced communication system has a high throughput. This is approached by constantly checking the plurality of predetermined time periods to ensure that information instead of idle bits are being transmitted. As a result, subscribers of the radio receivers may be charged a lower air-time fee because of the increased efficiency of the balanced system results in no or fewer idle bits being transmitted while other predetermined time period have an overloaded queue. Thus, with reassignment capability, the system determines which of the predetermined time periods have above average traffic levels and which predetermined time periods have below average traffic. Upon selecting appropriate radio receivers to be reassigned, preferably a radio receiver with above average system plan traffic level, the system is able to reassign the selected radio receivers to other predetermined time periods with below average system plan traffic level to eliminate idle time and excessive queueing on the plurality of predetermined time periods. In this way, the communication system is able to maintain a balanced traffic level on the plurality of predetermined time periods by redistributing the traffic to the plurality of predetermined time periods thereby eliminating the idle time periods and queueing on the plurality of predetermined time periods which results in higher information efficiency within the communication system which ultimately results in lower air-time charges to subscribers.

We claim:

1. A radio communication system having radio receivers assigned to a predetermined one of a plurality of predetermined time periods, comprising:

transmitting means for transmitting information during the predetermined one of the plurality of predetermined time periods assigned to at least one radio receiver;

receiving means for receiving information directed to said at least one radio receiver, said at least one radio receiver being individually assigned to receive the information during the predetermined one of the plurality of predetermined time periods;

means for monitoring a level of traffic associated with each of the plurality of predetermined time periods;

means for measuring a level of traffic associated with said at least one radio receiver during the predetermined one of the plurality of predetermined time periods assigned to said at least one selective call receiver;

means, coupled to said measuring means, for identifying if the level of traffic associated with said at least one radio receiver exceeds a predetermined threshold value during the predetermined one of the plurality of predetermined time periods;

means, coupled to said measuring means and to said identifying means, for generating a control signal;

said transmitting means for transmitting the control signal to said at least one radio receiver, said at least one radio receiver comprising:

means for receiving said control signal;

means, coupled to said receiving means, for decoding said control signal; and reassigning means, coupled to said decoding means, for reassigning said at least one radio receiver from said predetermined one of a plurality of predetermined time periods to another of the plurality of predetermined time periods having a lower level of traffic value associated therewith for reducing the level of traffic in said predetermined one of the plurality of predetermined time periods.

2. The communication system according to claim 1 wherein the plurality of predetermined time periods comprise a plurality of time frames on one or more radio frequencies.

3. The communication system according to claim 2 wherein the plurality of time frames are subdivided into a plurality of phases corresponding to a rate of information transmission.

4. The communication system according to claim 1 wherein the monitoring means further comprising:

means for determining the information transmission time and the idle transmission time of the plurality of predetermined time periods;

means for summing the information transmission time and the idle transmission time; and means for averaging the information time over the sum of the information transmission time and the idle transmission time.

5. The communication system according to claim 1 wherein the means for reassigning said at least one of the radio receiver to another of the plurality of predetermined time periods includes receiving an over-the-air control signal for reprogramming said at least one radio receiver to receive information on another of the plurality of predetermined time period designated by the control signal.

6. The communication system according to claim 5 wherein said at least one radio receiver includes an acknowledge-back transmitting means for transmitting a response to a request for reassignment, and for responding to a transmitting terminal of the receipt of the control signal for reassigning the radio receiver to another designated predetermined time period.

7. The communication system according to claim 5 wherein the means for reassigning reassigns the at least one radio receiver having a traffic level above the established threshold value.

8. The communication system according to claim 5 wherein the means for reassigning reassigns said at least one radio receiver having a traffic level below the established threshold value.

9. The communication system according to claim 1 wherein the means for reassigning further including:

means for selecting a radio receiver with a traffic level above a threshold value associated with the radio receiver;

means for calculating the traffic level of the predetermined one of the plurality of time periods assigned to the radio receiver being selected without including traffic contribution of the radio receiver being selected;

means for determining another time period for reassigning the radio receiver being selected; and said means for calculating the traffic level of the determined time period including the traffic contribution of the radio receiver being selected which balances traffic on the plurality of predetermined time periods.

10. In a radio communication system having radio receivers assigned to one of a plurality of predetermined time periods on at least one radio frequency, a method for reassigning the radio receivers, comprising the steps of:

(a) monitoring a level of received information traffic associated with each of the plurality of predetermined time periods for transmitting to at least one of the radio receivers;

(b) measuring a level of traffic associated with one or more radio receivers over one of the plurality of predetermined time periods;

(c) determining if one or more of the radio receivers during the one of the plurality of predetermined time periods have a traffic level above a threshold value; and (d) reassigning one or more radio receivers to reduce the traffic level of the one of the plurality of predetermined time periods when one or more of the radio receivers have a traffic level above the threshold value.

11. The method for reassigning radio receivers according to claim 10 wherein the step of measuring includes the step of selecting only the radio receivers receiving graphics and alphanumeric type information to be measured.

12. The method for reassigning radio receivers according to claim 10 wherein the step of reassigning radio receivers reassigns the radio receivers having a traffic level below the threshold traffic value.

13. The method for reassigning radio receivers according to claim 10 wherein the step of reassigning, comprises:
   (e) transmitting a service request to selected radio receivers to contact the service provider;
   (f) waiting a predetermined length of time for a telephone response from a user of the selected radio receiver;
   (g) transmitting an over-the-air control signal to the radio receivers of the selected radio receiver that has responded to a reassignment request; and
   (h) transmitting a verification signal during the reassigned predetermined time period for confirmation of reassignment of the radio receivers.

14. The method for reassigning radio receivers according to claim 13 wherein step (e) through step (h) communicate with the radio receiver with an acknowledge-back transmitting means for automatically transmitting a response to the request for reassignment.

15. A radio communication system having selective call receivers assigned to a predetermined one of a plurality of time periods, comprising:
   a transmitter for transmitting information during the predetermined one of the plurality of time periods assigned to at least one selective call receiver;
   a receiver for receiving information directed to said at least one selective call receiver, said at least one selective call receiver being individually assigned to receive the information during the predetermined one of the plurality of time periods;
   a microcomputer for monitoring a level of traffic associated with each of the plurality of time periods;
   said microcomputer for measuring a level of traffic associated with said at least one selective call receiver over the predetermined one of the plurality of time periods assigned to said at least one selective call receiver;
   said microcomputer for identifying if the level of traffic associated with said at least one selective call receiver exceeds a predetermined threshold value during the predetermined one of the plurality of time periods;
   said microcomputer also generating a control signal;
   said transmitter for transmitting the control signal to said at least one selective call receiver for reassigning said at least one selective call receiver, said at least one selective call receiver comprising:
   a receiver for receiving said control signal;
   a decoder, coupled to said receiver, for decoding said control signal; and
   a microcomputer, coupled to said decoder, for reassigning said at least one selective call receiver from said predetermined one of the plurality of time periods to another of the plurality of time periods having a lower level of traffic value associated therewith for reducing the level of traffic in said predetermined one of the plurality of time periods.

* * * * *